US008675018B2

(12) United States Patent
Mishra et al.

(10) Patent No.: US 8,675,018 B2
(45) Date of Patent: Mar. 18, 2014

(54) ELECTROMECHANICAL SURFACE OF ROTATIONAL ELEMENTS FOR MOTION COMPENSATION OF A MOVING OBJECT

(75) Inventors: Pragyana K. Mishra, Kirkland, WA (US); Eyal Ofek, Redmond, WA (US); Gur Kimchi, Belleuve, WA (US)

(73) Assignee: Microsoft Corporation, Redmond, WA (US)

( * ) Notice: Subject to any disclaimer, the term of this patent is extended or adjusted under 35 U.S.C. 154(b) by 1497 days.

(21) Appl. No.: 11/850,475

(22) Filed: Sep. 5, 2007

(65) Prior Publication Data

US 2009/0058855 A1 Mar. 5, 2009

(51) Int. Cl.
| | | |
|---|---|---|
| *G09G 5/00* | (2006.01) | |
| *G09G 5/14* | (2006.01) | |
| *G06T 11/00* | (2006.01) | |
| *G06T 11/60* | (2006.01) | |
| *G06T 19/00* | (2011.01) | |

(52) U.S. Cl.
CPC *G09G 5/14* (2013.01); *G06T 11/00* (2013.01); *G06T 11/60* (2013.01); *G06T 19/00* (2013.01); *G06T 19/006* (2013.01)
USPC ............................ 345/633; 345/629; 345/634

(58) Field of Classification Search
CPC .......... G06G 5/14; G06T 11/00; G06T 11/60; G06T 19/00; G06T 19/006
USPC ............................ 345/629–632; 482/1–4, 148
See application file for complete search history.

(56) References Cited

U.S. PATENT DOCUMENTS

| | | | |
|---|---|---|---|
| 6,135,928 A | 10/2000 | Butterfield | |
| 6,152,854 A | 11/2000 | Carmein | |
| 6,285,379 B1 | 9/2001 | Gallery | |
| 6,916,273 B2 | 7/2005 | Couvillion et al. | |
| 7,150,704 B2 | 12/2006 | Schaeffer | |
| 7,382,267 B2* | 6/2008 | Brendley et al. | 340/573.1 |
| 7,387,592 B2* | 6/2008 | Couvillion et al. | 482/8 |

(Continued)

FOREIGN PATENT DOCUMENTS

| | | |
|---|---|---|
| WO | WO9742620 A1 | 11/1997 |
| WO | WO2006-017926 A1 | 2/2006 |

OTHER PUBLICATIONS

Darken et al., "The omni-directional treadmill: a locomotion device for virtual worlds", ACM, 1997, pp. 213-221.

(Continued)

*Primary Examiner* — Jin-Cheng Wang
(74) *Attorney, Agent, or Firm* — Steve Spellman; Jim Ross; Micky Minhas

(57) ABSTRACT

Mechanical surface of rotational elements for motion compensation of a locomotive object. A single layer of rotational elements formed as a mechanical surface on which a human can stand and/or move, and which automatically compensates for diverse human locomotion such as translation in two dimensions and rotation. The surface can be used to actively sense and compensate for varying speeds of human motion while in locomotion on the surface. The layer allows a user to move freely within a confined area and to be maintained within the confined area via motion compensation. Thus, the surface is particularly suited for immersion visualization environments where user motion on the surface is translated into user navigation through a virtual environment such as for computer games and simulation without necessitating constraints on immersive scene projection or participant motion.

20 Claims, 13 Drawing Sheets

(56) References Cited

U.S. PATENT DOCUMENTS

| | | | |
|---|---|---|---|
| 7,399,258 B1 * | 7/2008 | Sugar et al. | 482/54 |
| 7,520,836 B2 * | 4/2009 | Couvillion et al. | 482/8 |
| 7,588,516 B2 * | 9/2009 | Couvillion et al. | 482/8 |
| 2003/0232698 A1 * | 12/2003 | Couvillion et al. | 482/4 |
| 2004/0214690 A1 | 10/2004 | Couvillion et al. | |
| 2007/0003915 A1 | 1/2007 | Templeman | |

OTHER PUBLICATIONS

Yoon et al., "A Novel Locomotion Interface with Two 6-DOF Parallel Manipulators That Allows Human Walking on Various Virtual Terrains", retrieved at << http://ijr.sagepub.com/cgi/content/abstract/25/7/689>>, vol. 25, No. 7, SAGE, 2006, p. 1.

Yoon et al., "Design and Analysis of a Novel Virtual Walking Machine", IEEE, Mar. 22-23, 2003, pp. 8.

* cited by examiner

ELECTROMECHANICAL SURFACE OF ROTATIONAL ELEMENTS FOR MOTION COMPENSATION OF A MOVING OBJECT

BACKGROUND

In immersive visualization environments, images are projected on surfaces surrounding the viewer such as the four walls, floor, and ceiling of a room or even using a heads-up display. As the viewer moves and turns these images change, thus, creating an illusion of walking in the imaged environment. However, the movement of the viewer has to be confined to the immersive area within the room. The surface of the floor beneath the viewer has to compensate for movement, thereby placing the viewer at approximately the same position. In addition to these disadvantages, the viewer, in many cases, has to wear specialized head gear or glasses to view the scene. This restricts the viewer's freedom to move in any direction and also constrains the visualization of the immersive scenes.

The movement of a viewer in an immersive environment is typically in two dimensions—forward and lateral motion of the viewer. In addition to two-dimensional translations along the plane of the floor, the viewer may rotate as well. A motion-compensating surface under the feet of the viewer must accommodate rotations. Presently, there is no such motion-compensating surface that can account for translations in both directions on the plane and rotation of viewer locomotion.

Viewer motion-compensation mechanisms such as large spherical shells on rollers or treadmill-type mechanisms, for example, require large spaces and are cumbersome. The spherical devices require that the user operate from inside the sphere. This device cannot be used for immersive environments where the scene is projected onto the natural surroundings of the viewer and requires space to accommodate a sphere whose diameter is larger than the height of the viewer.

The treadmill-type devices are extremely cumbersome and complex to operate, requiring sophisticated sensors and layers of hardware interfaces that have to perform synchronously. The treadmill device is predominantly a one-dimensional (1-D) system, although there is the possibility of a 2-D treadmill, or walking in a giant ball, but these require a large space underneath the user. A robotic-tile system is different from the treadmill-type devices and ball system, and requires the rearrangement of tiles while the viewer is moving. The speed of rearrangement of the tiles underneath constrains the speed and rotation in motion of the viewer.

A powered shoes design requires the viewer to wear specialized roller skates to compensate for locomotion. The active roller skates design does not allow the user to run or burst into quick sprints—the viewer has to be comfortable and skilled in roller skating. A new system employs shoes that are tied (or tethered) to motors on a turntable on which the user moves. However, this is a very unreliable contraption that requires the user to wear special shoes. Moreover, the use of strings and motors introduces an inertial lag in the user experience related at least to ramp up and low down during user movement on the turntable.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Disclosed is an electromechanical surface or layer of rotational elements, actuators and sensors on which a human (or object) can stand and/or move, and which automatically compensates for diverse human locomotion such as translation in two dimensions and rotation. The surface can be used to actively sense and compensate for varying speeds of human (or object) motion while in locomotion on the surface. This motion can range from slow walking to sudden sprints. Environmental factors involved in foot traction during ambulation such as shoe material and contaminants are also compensated for in a feedback loop.

The surface allows participants to move freely within a confined area and to be maintained within the confined area at the same time. Thus, the surface is particularly suited for immersion visualization environments where user motion on the surface is translated into user navigation through a virtual environment such as for computer games and simulation without necessitating constraints on immersive scene projection or participant motion.

The surface is portable, modular, and extensible for placement in rooms, offices and gyms, for example. Being modular, multiple surfaces can be connected to make a larger operational surface. The surface allows the viewer to be free from wearing any specialized head gear or glasses to view the scene; however, any of these devices can be used in combination with the surface if necessary.

The surface of rotational elements can be miniaturized to approach traction and tribologic properties (having to do with friction, lubrication and wear, or more generally, with the interaction of surface in relative motion) of surfaces as varied as artificial turfs, carpets, grass, and marble—simply by sensing and controlling the roll or slippage of the elements.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
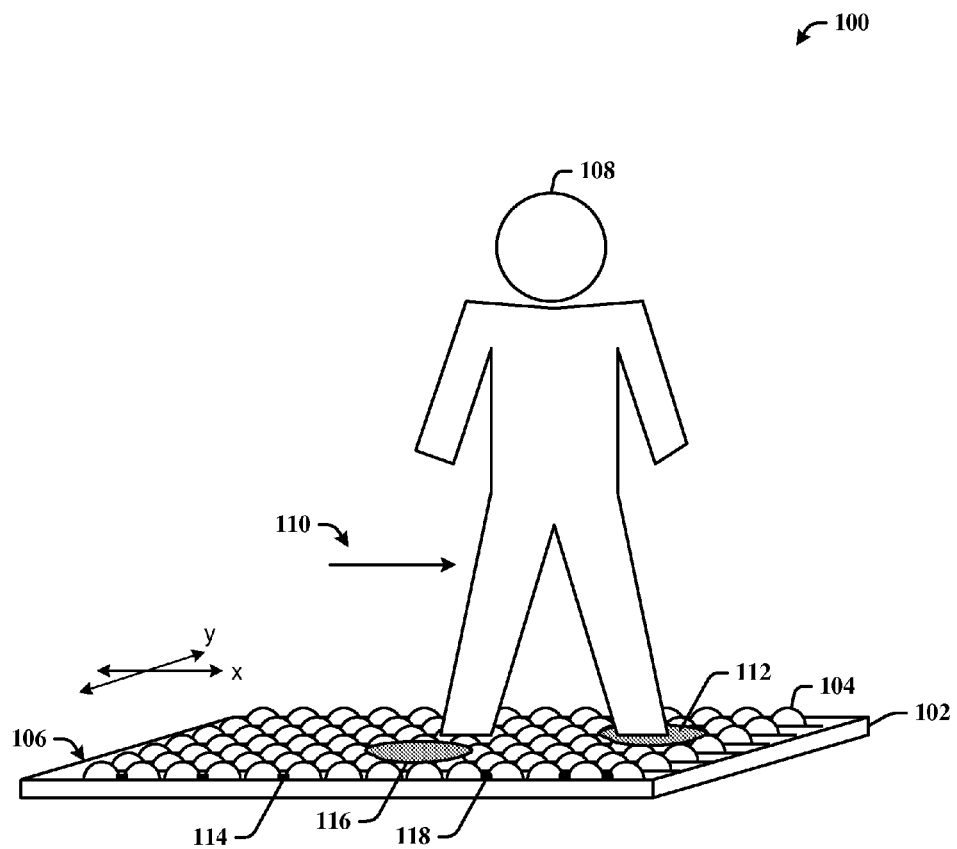
FIG. 1 illustrates an exemplary motion compensation system.

The disclosed system is an electromechanical surface defined by a layer of rotational elements (e.g., spherical balls or rollers), actuators and sensing elements on which a user (or object) stands and then moves. The surface is controlled to compensate for the user (or object) movement by continually controlling the rotational elements to move the user back (or object) to the desired location (e.g., center) of the surface. The diverse applications of the mechanical surface range from military mission simulations to gaming simulations and exercise, for example.

The system is particularly suited for immersive environments such as virtual reality rooms where a projected scene surrounds the viewer. The viewer moves in the environment (via the surface) and the projected scene changes according to viewer movement. The surface connects to a computing system that changes the projected scene based on the user movement. Not only is the motion of the viewer sensed for changing the surrounding scene, but the motion is confined to the area within the surface and hence, the immersive environment. Note that the term "surface" or "layer" as used herein is intended to include all mechanical and electrical components, and supporting structures for the components. For example, this includes the rotational elements, the actuators for driving the elements, the sensors, the wires and interconnects to and from the sensors and actuators, the structural assemblies that capture or support the rotational elements, actuators and sensors, and external interfaces to data acquisition and control computer(s) for the immersive environment.

The viewer's motion can be a translation along multiple dimensions of the floor (e.g., forward and lateral) as well as rotational (e.g., turning around a vertical axis) motion. The viewer can slowly stroll, walk, run, and/or suddenly burst into sprinting. This diverse set of motions is accommodated by a roller design of a set of rolling balls under the feet (or other body parts) of the viewer. The rotation of roller balls can be controlled in multiple directions by actuator motors, for example.

The gait and motion of the viewer can be sensed by tachometric sensors in at least two axes (e.g., an x-axis for forward and backward motion, and y-axis for lateral motion). A feedback loop controls the speed of the actuators to compensate for sensed gait and motion of the viewer.

Other sensor systems can also be employed as well, for example, a load-cell system (using strain gauges) that measures downward pressure or weight of the viewer. This system can facilitate computation of the viewer location on the surface using three sensors, for example, for triangulation over the surface. Readout from the rollers that are under the weight of the viewer (e.g., one or more footprints) can provide an "image" of the viewer footprint. An alternative system for determining user location can be a camera system from a high angle and/or the sides of the surface. Other alternative location-determining systems can include optical, electromagnetic, sonic, etc., measurement and control system, for example.

In the context of this description, there are three stages in a human gait: (1) touchdown, (2) full load, and (3) push off. In order to avoid slipping while walking, the horizontal and vertical forces applied by the person's feet should be resisted by forces acting against the foot as the foot contacts the walking surface. When the area of the foot (and the heel while walking) comes down on the surface, the contact point presents a thrust vector that applies both normal and horizontal forces simultaneously. This result is different that when the heel or the foot is in contact for some time prior to application of the horizontal force.

The roller ball (rotational element) is actively controlled to vary the horizontal thrust vector. This not only allows for compensating motion, but also simulates a surface on which the human is moving. For example, to simulate a marble floor, the roller balls are allowed to rotate faster than what would be used for simulating an artificial turf or gravel surface. The horizontal thrust vector is allowed to be smaller for the former case than the thrust vector for the latter, by rotating the roller balls at higher speeds, thus varying the friction between the surface and shoes.

Factors affecting traction between a shoe and a surface include (1) floor material, (2) shoe material, (3) substances between the floor and the shoe (such as dirt, water, or lubricants) and (4) gait dynamics. While control over the first three factors is problematic, the traction can still be controlled by actively sensing gait dynamics and then accounting for gait. Uncontrollable variables include who or what is walking or running, how the user walks, and the kind of shoes. The disclosed surface can accommodate all the above constraints through a feedback loop.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates an exemplary motion compensation system 100. The system 100 includes a layer 102 of rotational elements 104 (e.g., spherical rollers) for rotating in multiple dimensions. The layer 102 is defined by a perimeter 106 relative to which a locomotive object 108 (e.g., a human) contacts the rotational elements 104 in association with movement 110 to a location 112 of the layer 102.

The system 100 further includes a control assembly 114 integral to the layer 102 for rotating the elements 104. The control assembly 114 is comprised of a plurality of devices (e.g., actuators) which when controlled, will rotate the elements 104 in the desired manner. The control assembly 114 is controlled to compensate for the movement 110 by moving the object 108 to a predetermined location 116 (e.g., the center of the layer 102 as defined by the perimeter 106) on the layer 102. In other words, in 2-D space the layer 104 can be controlled to maintain the object 108 in the desired area, and in 3-D space the layer 104 can be controlled to maintain the object 108 in the desired volume of space.

Where the object 108 is a user, the user can be in motion such as related to walking, running, etc., and the location of the user motion (forward, lateral, etc.) is continually monitored relative to the perimeter 106. The layer 102 is controlled to dynamically move the user to the predetermined location 116 (e.g., the center of the layer 102).

The system 100 can also include a sensing assembly 118 integral to the layer 102 for sensing rotation of the rotational elements 104. The sensing assembly 118 includes a plurality of sensors (e.g., tachometers) for tracking and generating rotational data for the elements 104. This data is then sent to a control system (not shown) for processing, and for control of the control assembly 114.

The layer 102 functions as an input device for interacting with the immersive environment, and an output device when controlling the user back to the desired point on the layer 102. As an output device, a control computer can impose force feedback to provide a more realistic sense of what is being perceived. For example, if the user is viewing a truck moving past or perhaps riding in the truck, force feedback can induce oscillatory motion in the rotation elements 104 such that the user is made to feel ground vibrations or truck bounce. This can further be accompanied by audio data of the truck driving past or of engine sounds, for example.

In another embodiment, multiple layers 102 for different individuals can be employed in the immersive environment, for example, in a multi-user first-person-shooter gaming environment. Individual player computing systems can then be connected in a peer-to-peer fashion or though a network gaming server, for example. In any scenario with multiple users, correspondingly multiple layers 102 can be controlled to provide a more rich and interactive experience.

Figure 2:
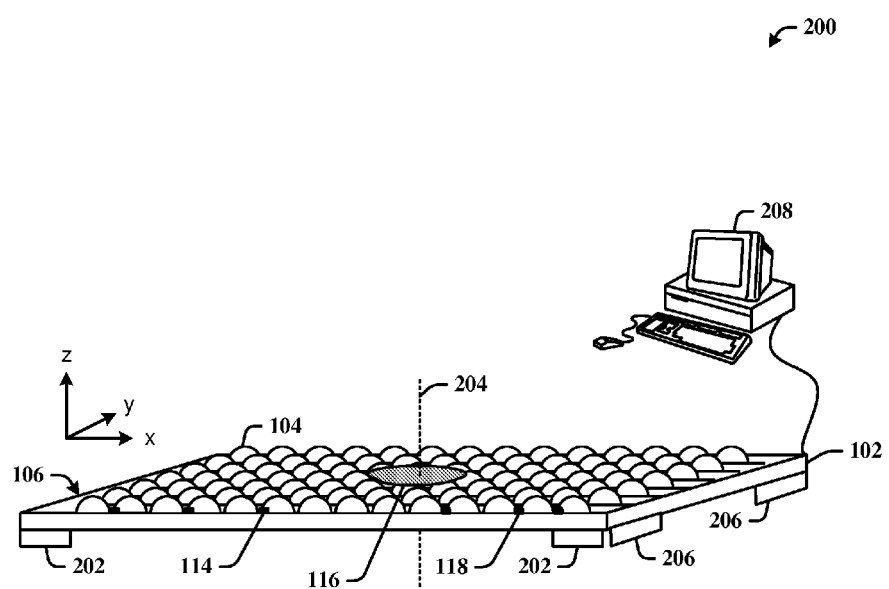
FIG. 2 illustrates the layer that employs a location sensing system for computing location of the user.

FIG. 2 illustrates the layer 102 that employs a location sensing system for computing location of the user. In one implementation, the layer 102 can include weight (or pressure) sensors 202 at corners (as part of a location sensing system) which enable detection of the fact that the user is not at the predetermined location 116 (e.g., the center) of the layer 102. More specifically, it is intuitive that the user (or object) in locomotion should be at or near a center point or area defined by the intersection of a vertical axis 204 with the layer 102 defined relative to the perimeter 106. Although illustrated as a polygon (e.g., a rectangle or a square), the layer 102 can be manufactured in a circular fashion (e.g., a circle or ellipse), although such a design can limit the modular extensibility facilitated by using polygonal shapes.

The layer 102 can also include or be associated with a lift (or elevation) system that comprises one or more lift mechanisms 206 for tilting or raising the layer 102 (now configured in a rigid format or placed in a suitable rigid frame) in the desired manner to introduce a grade or tilt to the user under locomotion.

One or more computing systems 208 can connect to the layer 102, the control assembly 114, sensing assembly 118, location sensing system sensors 202, and/or lift system mechanisms 206 to control the overall operation and experience for the user. The computing system(s) 208 can control a feedback loop to move the user back to the center of the layer 102. Additionally, the computing system 208 can control the layer 102 as a "force feedback" mechanism. For example, in an immersive visualization experience, if the user is standing in a train in a virtual environment, the layer 102 can be controlled to induce oscillatory signals that cause the layer 102 shake, thereby providing a more realistic experience to the user.

In lieu of the lift system mechanisms 206, the elements 104 of the layer 102 can be controlled to simulate terrain effects such as tilt, slope or elevation changes. For example, tension/roll-rate/rotation speed can be controlled to simulate slip/slide or climbing effects by requiring the user to apply more force.

The layer 102 can be made mechanically flexible for placing the layer 102 over a surface having one or more curvatures. The layer 102 then conforms to the surface to provide varying terrain over which a user can move.

In one embodiment, the computing system 208 or a second computing system (not shown) can use a mapping and location service to project such 2-D or 3-D images, and through which the user will navigate by moving in the layer 102. Terrain associated with navigating through the virtual geography can be simulated by force feedback to the layer 102 and/or by controlling rotation of the elements 104 to simulate slope, elevation, tilt, etc.

Figure 3:
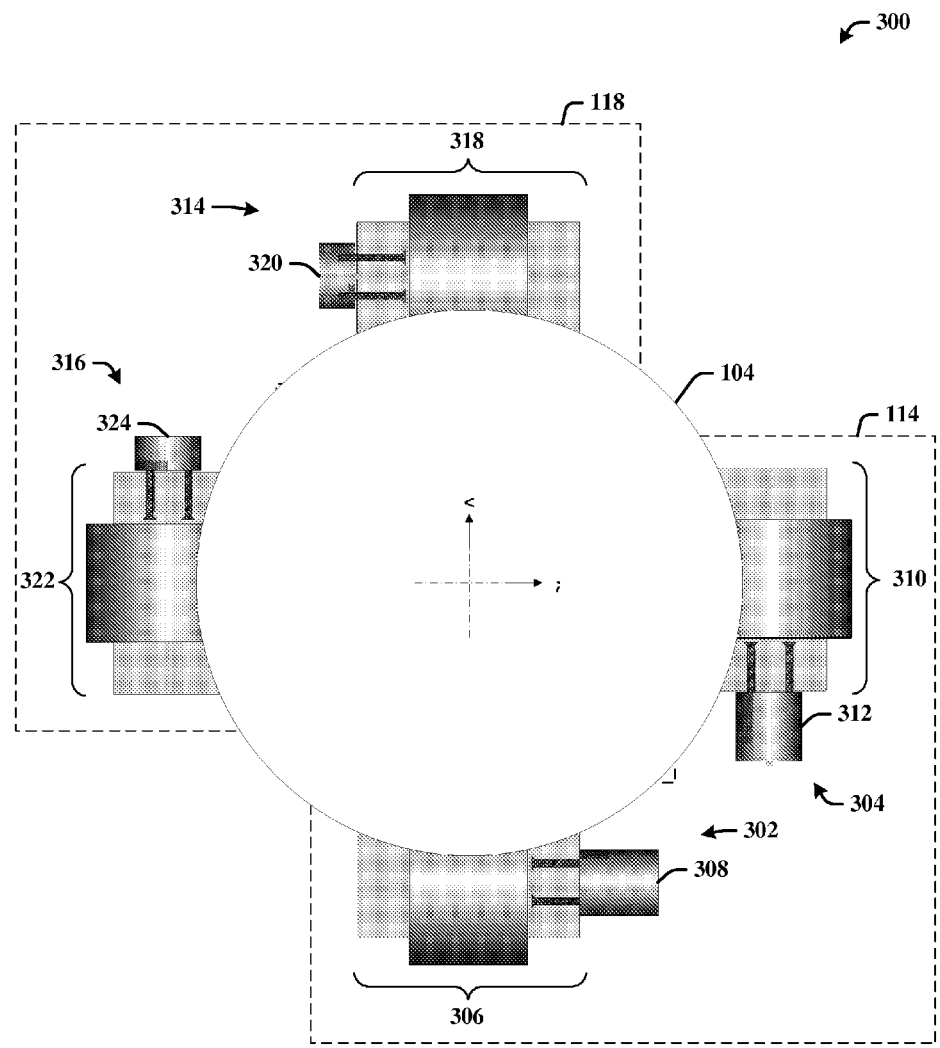
FIG. 3 illustrates a top-down view of an exemplary rotational element assembly.

FIG. 3 illustrates a top-down view of an exemplary rotational element assembly 300. The assembly 300 shows spherical rotational element 104 about which are imposed the control assembly 114 and sensing assembly 118. The control assembly 114 includes an x-drive assembly 302 for the x-axis rotation and a y-drive assembly 304 for the y-axis rotation. The x-drive assembly 302 includes x-electromechanical members 306 (and mountings) for contacting the element 104 to impart variable acceleration and braking to the element 104. The x-drive assembly 302 also includes an x-actuator 308 for driving parts of the x-electromechanical members 306 for variable acceleration and braking of the element 104 along the x-axis. The y-drive assembly 304 includes y-electromechanical members 310 (and mountings) for contacting the element 104 to impart variable acceleration and braking to the element 104. The y-drive assembly 304 also includes a y-actuator 312 for driving parts of the y-electromechanical members 310 for variable acceleration and braking of the element 104 along the y-axis.

The sensing assembly 118 includes an x-sensing assembly 314 for the x-axis rotation and a y-sensing assembly 316 for the y-axis rotation. The x-sensing assembly 314 includes x-electromechanical members 318 (and mountings) for contacting the element 104. The x-sensing assembly 314 also includes an x-sensor 320 for generating rotation data from the x-electromechanical members 318 as the members 318 rotate along the x-axis based on contact with the element 104. The y--sensing assembly 316 includes y-electromechanical members 322 (and mountings) for generating rotation data from the y-electromechanical members 322 as the members 322 rotate along the y-axis based on contact with the element 104. The y-sensing assembly 316 also includes a y-sensor 324 for generating rotation data from the y-electromechanical members 322 as the members 322 rotate along the y-axis based on contact with the element 104.

Note that not all of the assemblies 300 need to include the rotational sensing assembly 118. For example, to reduce cost, overall weight, etc., the sensing assembly 118 can be employed with every other rotational element 104. Additionally, the drive assembly members 306 and the x-electromechanical members 318 for the x-axis can be provided as a single unit or assembly.

The x-drive assembly 302 and x-sensing assembly 314 are aligned on the y-axis and in opposing contact with the rotational element 104. Similarly, the y-drive assembly 304 and y-sensing assembly 316 are aligned on the x-axis and in opposing contact with the rotational element 104.

Figure 4:
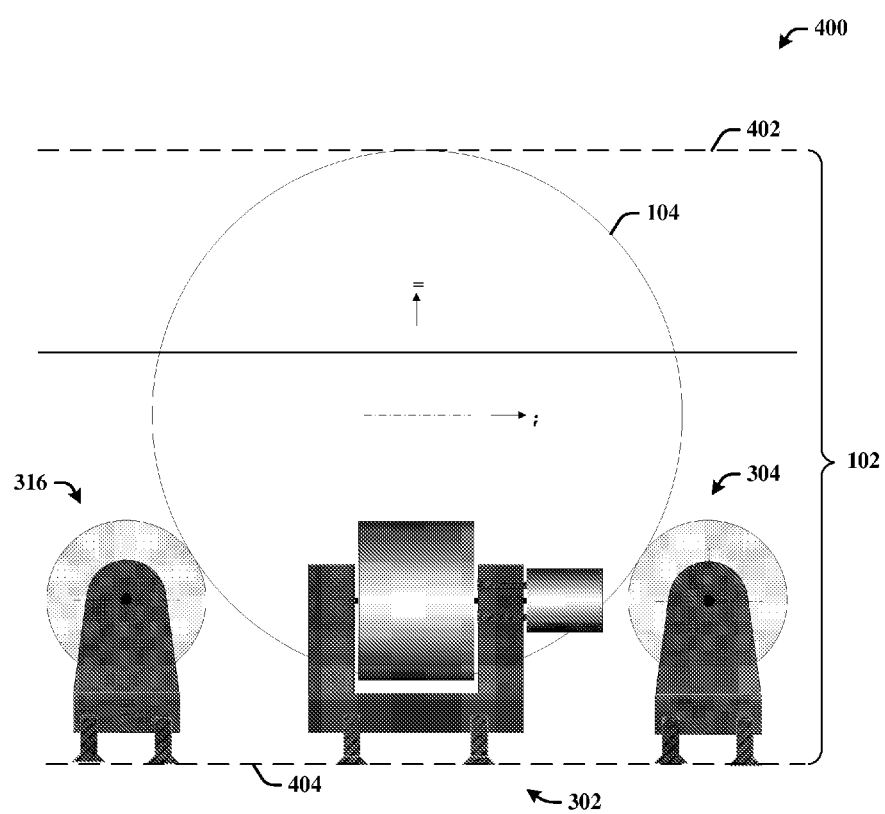
FIG. 4 illustrates a side view of the exemplary rotational element assembly.

FIG. 4 illustrates a side view 400 of the exemplary rotational element assembly 300. The control drive assemblies (302 and 304) are illustrated, as well as the y-sensing assembly 316. The layer 102, as referred to throughout this description, can be defined to include all parts and assemblies used therein, and which constitute an overall the thickness (or height) from the top 402 of the rotational element 104 to the mounting apparatus (e.g. screws or fasteners) 404. Thus, the layer 102 is a single layer of rotational elements 104 and associated sensor assemblies and control assemblies.

Figure 5:
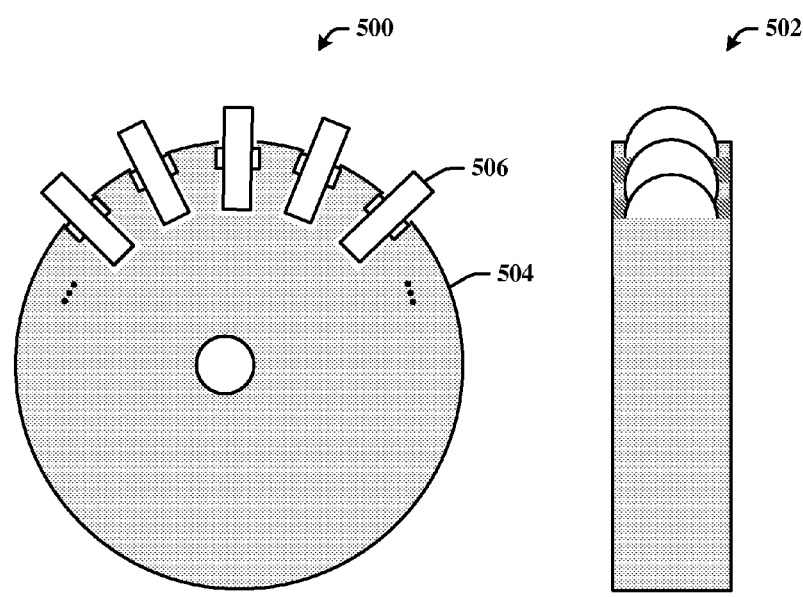
FIG. 5 illustrates a side view and a frontal view of an actuator disk for driving the rotational elements.

FIG. 5 illustrates a side view 500 and a frontal view 502 of an actuator disk 504 for driving the rotational elements. The actuator disk 504 includes additional smaller disks 506 on the perimeter of the actuator disk 504, the smaller disks 506 reducing the friction in a direction orthogonal to the actuator disk 506. Note that only a few of the smaller disks 506 are shown—the smaller disks 506 are aligned along sections of the perimeter or the entire perimeter of the actuator disk 504. The smaller orthogonal disks 506 can be reduced in size to correspondingly reduce friction in the direction that is orthogonal to the actuator disk 504.

Figure 6:
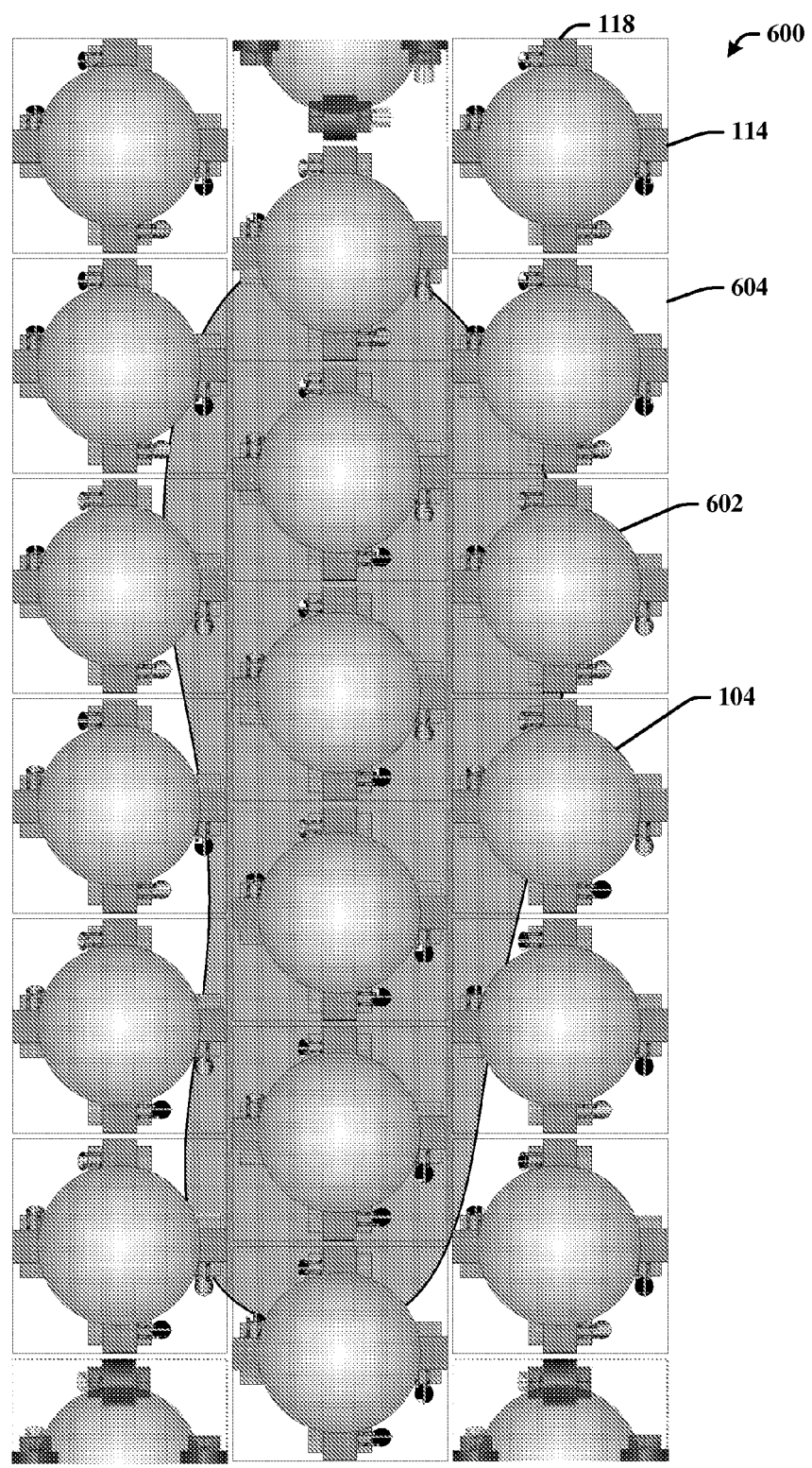
FIG. 6 illustrates a subsection of the layer where a footprint is imposed on rotational elements of the subsection.

FIG. 6 illustrates a subsection 600 of the layer where a footprint 602 is imposed on rotational elements 104 of the subsection 600. The subsection 600 is viewed from under the footprint of a person. The footprint 602 is associated with weight imposed over an array of the rotational elements 104, actuators and sensors that comprise a rotational element assembly 604. In this particular embodiment, each rotational element assembly 604 (e.g., the element 104, control assembly 114, and sensing assembly 118 of FIG. 1) lies within a six centimeter cube and can be stacked together with other assemblies 604 to form the layer (or surface) 102. The two degrees-of-freedom of each rotational element 104 is actively controlled to compensate for the locomotion imposed by the person's footprint 602. In a more complete implementation, the dimensions of the total area of the modular layer 102 can be are two meters square (considering a normal stride length for running human).

Other dimensions can be configured. For example, individual rotational element assemblies 604 can be further miniaturized to dimensions of about one millimeter in diameter or smaller, for example, given the advances in micro-electromechanical devices (e.g., micro-electromechanical machines (MEMs)). The capability of reducing the size facilitates different applications. For example, the subsection 600 can be reduced in size to be used as a handheld input device. A user can use a thumb to roll over the rotation elements 104 as a means of navigating through a scene or controlling a virtual object. Other buttons or controls can also be provided in combination with the input device for more complex control by the user.

The friction coefficient, both static (includes rolling) and kinetic (includes sliding), can be simulated by controlling the roll or slippage of individual element assemblies 604. This makes the layer 102 ideal for tribology, traction tests, and simulation of nearly any kind of floor surface.

It is to be understood that all vertical actuators can be connected and driven by a single motor, as well as the horizontal actuators. In an alternative embodiment, all vertical actuators are driven by a separate motor and the horizontal actuators can be driven by a separate motor as well. In yet another embodiment, the control assembly drives a subset of the rotational elements separately.

Figure 7:
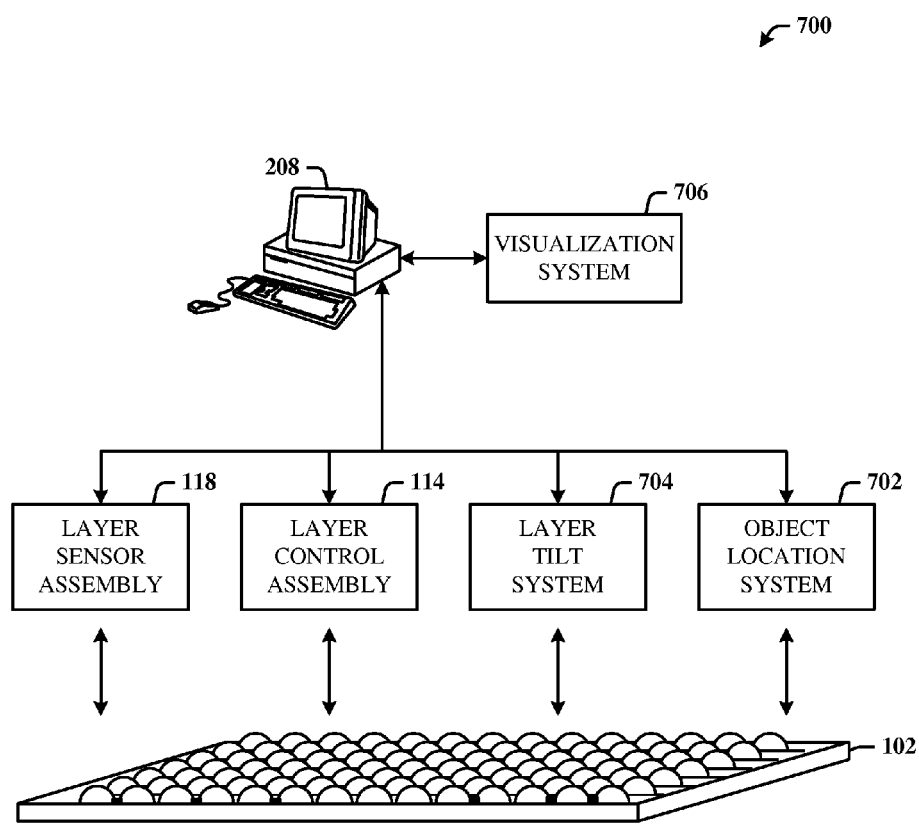
FIG. 7 illustrates a data acquisition and control system for controlling the layer to provide locomotion compensation.

FIG. 7 illustrates a data acquisition and control system 700 for controlling the layer to provide locomotion compensation. The system 700 can include the computer system 208 for receiving data from the sensing assembly 118 and an object location system 702. The object location system 702 is for continuously determining the location of the user (or object) on the layer 102. As previously described, this can include using weight sensors (e.g., pressure, load cell), linear displacement sensors, and/or an external object location system using one or more cameras (e.g., two), signal strength, or other location techniques (e.g., sonic sensors). The camera(s) can also be employed to provide position and/or orientation of the user on the layer 102 and/or to detect the number of persons participating in the immersion experience on one or more layers 102.

The system 700 can also include a layer tilt system 704 for changing tilt, grade or elevation of the layer 102. The system 700 can include a visualization system 706 that is external to the computer system 208 for projecting information, graphics, etc., in an immersion environment. It is to be understood that the computer system 208 can also present visualizations (e.g., games) via which the user interacts while in locomotion on the layer 102. These visualizations can be both on the computer system 208 and external thereto. Additionally, the user can wear headgear and other conventional visualization apparatus in combination with the layer 102.

The means for communication or connection to the layer panels by the computer system 208 can be via wire tether(s) and/or wireless transceiver, for example. In other words, a wireless transceiver system (e.g., Bluetooth, IEEE 802.11x) can interface to the layer panel for data acquisition and control.

Figure 8:
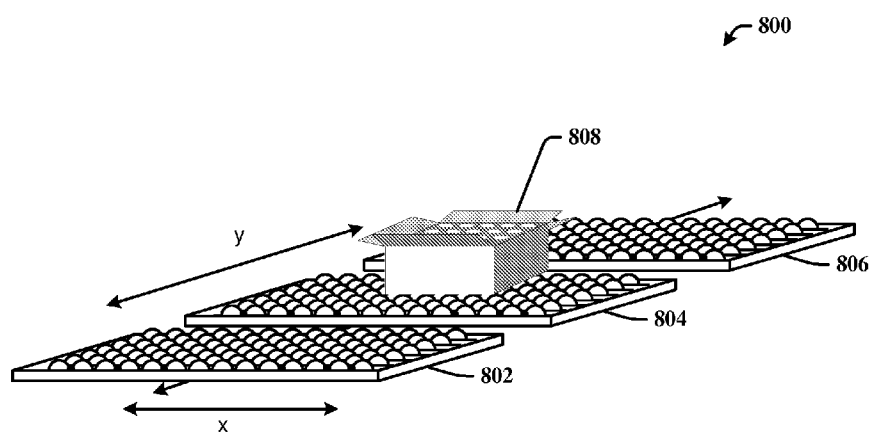
FIG. 8 illustrates the modular extensibility that can be obtained in accordance with the disclosed electromechanical layer.

FIG. 8 illustrates the modular extensibility that can be obtained in accordance with the disclosed electromechanical layer. Here, three layers: 802, 804 and 806 are engaged side-by-side in a y direction to provide a 3×1 arrangement. It is also possible to extend the layout in the x-direction by simply adding and connecting additional layers to provide, for example, a 3×3 or larger layout.

This particular arrangement is suitable for industrial applications, for example, where an object 808 (e.g., a package, container, vehicle, etc.) is being moved down a conveyor constructed of multiple interconnected layers (802, 804 and 806). The layers (802, 804 and 806) can be controlled to rotate the object 808 in the horizontal plane to, for example, read bar codes or other information from the outside packaging. Where load cells (not shown) are provided under the layers (802, 804 and 806), the object 808 can be weighed as it moves down the conveyor, which can also facilitate maintaining the object 808 toward a center line 810 of the conveyor.

It is to be understood that the layers (802, 804 and 806) are not limited to being utilized in a single plane. For example, the layers can be connected in a 3-D manner such that the object 808 can be contacted not only on the bottom, but also one or more sides as well. This also means that where both sides contact layers, the object 808 can be elevated as it moves down the conveyor. These are just a few of the control capabilities that can be employed with the layers (or surfaces).

Figure 9:
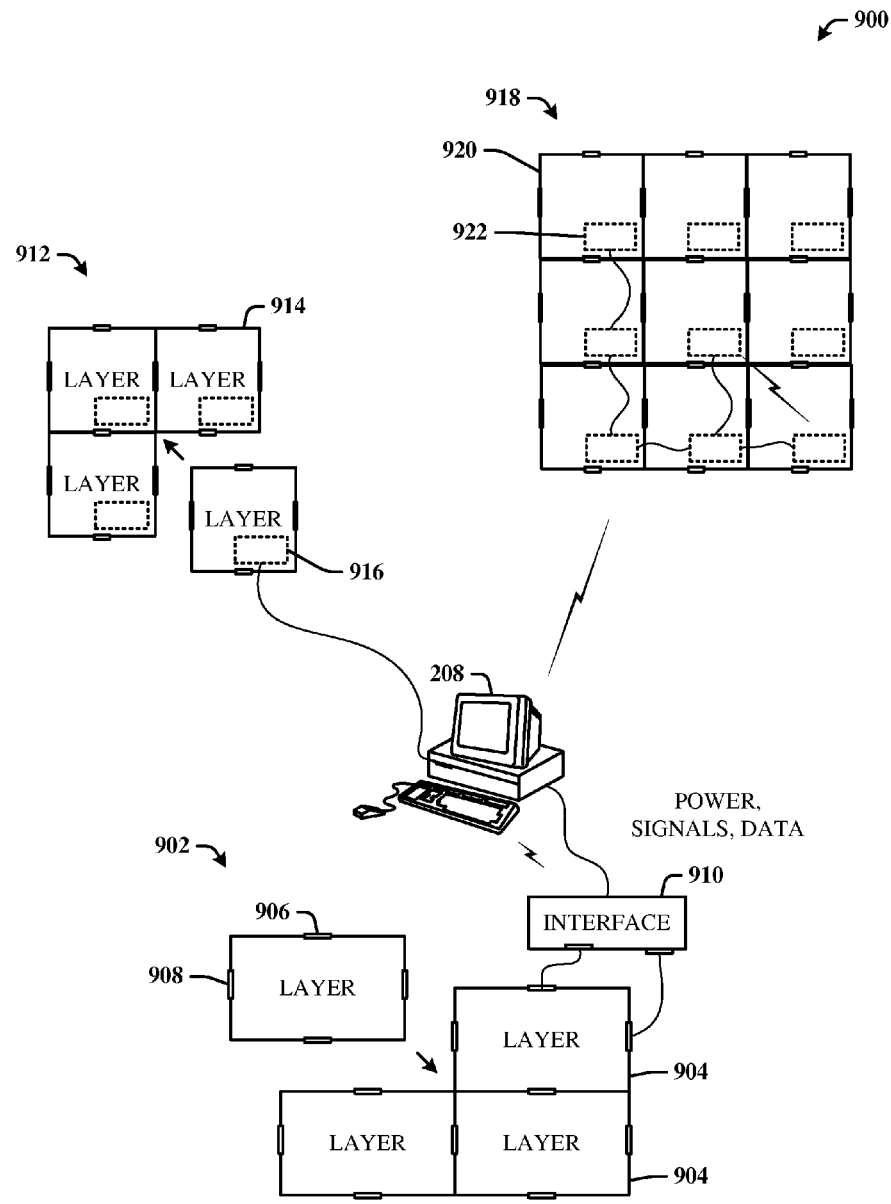
FIG. 9 illustrates a multi-layer system for an immersion environment.

FIG. 9 illustrates a multi-layer system 900 for an immersion environment. The system 900 includes a first configuration 902 of rectangular layers 904 (similar to layer 102) assembled in a 2×2 arrangement. Each layer 904 can include a set of connectors (906 and 908) that facilitate power, signals and data to and from the other layers 904. In one embodiment, the signals and data are provided over an IEEE 802 technology (e.g., Ethernet), and/or a serial communications technology (e.g., USB, IEEE 1394). The connectors (906 and 908) can be configured to connect separately to x-drive electromechanical and sensing assemblies (e.g., connectors 906) or y-drive electromechanical and sensing assemblies (e.g., connectors 908), or both.

In the configuration of 902, an interface 910 can be provided for interfacing the layer connectors (906 and 908) to one or more computers (e.g., computer 208). The interface 910 can be an add-in board to the computer 208, for example, that communicates with the computer 208 to provide control signals to the layers 904, receive data back, and also provide power to the layers 904. However, power can also be applied via an external component or module (not shown) that connects to one layer 904 and thereby provides power to other connected layers 904. The interface 910 can provide wired and/or wireless communications to/from the computer 208, for example, using licensed and/or unlicensed wireless technologies.

The system 900 can also include a second configuration 912 of square layers 914. Here, the layers 914 each include an onboard control module 916 such that the layers 914 can operate more independently from the computer 208. In other words, the module 916 can include a controller, communications circuits, and memory for managing onboard tasks (e.g., controlling the actuators, sensing data, storing settings, etc.). This also offloads computing power to the module 916 that would otherwise be required by the computer system 208. The module 916 can also store and launch programs that facilitate intercommunications to other layers modules 914 of the configuration 912 for signals and/or data.

The system 900 can also include a standalone mesh configuration 918 that can operate according to mesh technology. Each layer 920 includes an onboard module 922 that can be more robust in computing power than the module 916 to operate independently of the computer system 208. Each module 922 can include wired and/or wireless communications for communicating with other layer modules 922. If one layer 920 should fail or go temporarily offline, it can be rendered to simply provide a surface of rotating elements, while the other layers provide the control to move the object to the desired position. This also facilitates "hot" replacement of the failed layer while the other layers are operational. Once the failed layer 920 is replaced, the onboard modules 922 can sense this and "boot" the new layer into the mesh. The mesh configuration can communicate to the computer system 208, if desired, to obtain data, to download updates to the software running on the modules 922, or perform diagnostics, for example. Note that only a few of the modules 922 are shown to be wire connected, for description purposes only. As further illustrated, the modules 922 can communicate wirelessly as well.

Figure 10:
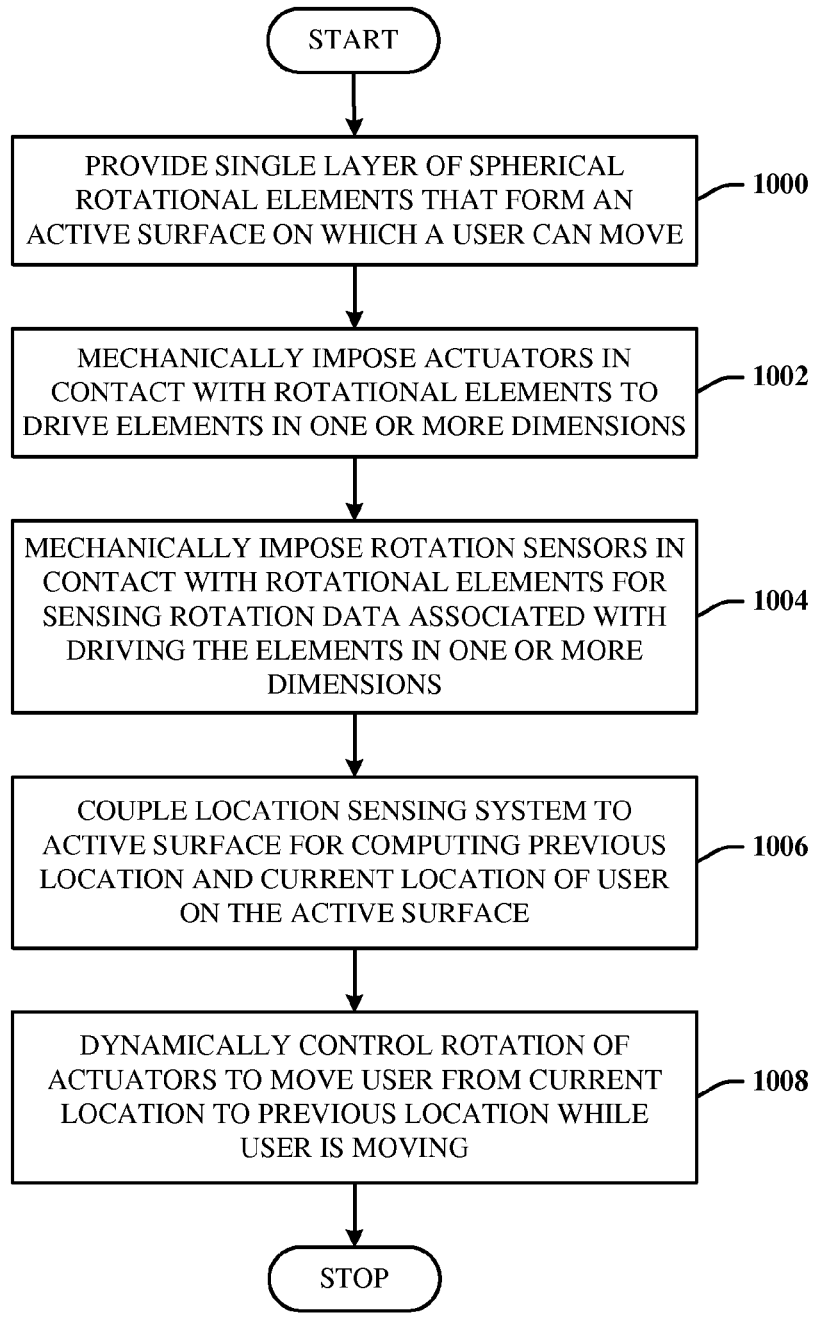
FIG. 10 illustrates a method of providing motion compensation in an electromechanical layer.

FIG. 10 illustrates a method of providing motion compensation in an electromechanical layer. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 1000, a single electromechanical layer of spherical rotational elements is provided that form an active surface on which a user can move. At 1002, actuators are mechanically imposed in contact with the rotational elements to drive the elements in one or more dimensions. At 1004, rotation sensors are mechanically imposed in contact with the rotational elements for sensing rotation data associated with driving the elements in the one or more dimensions. At 1006, a location sensing system is coupled to the active surface for computing a previous location and a current location of the user on the active surface. At 1008, rotation of the actuators is dynamically controlled to move the user from the current location to the previous location while the user is in motion.

Figure 11:
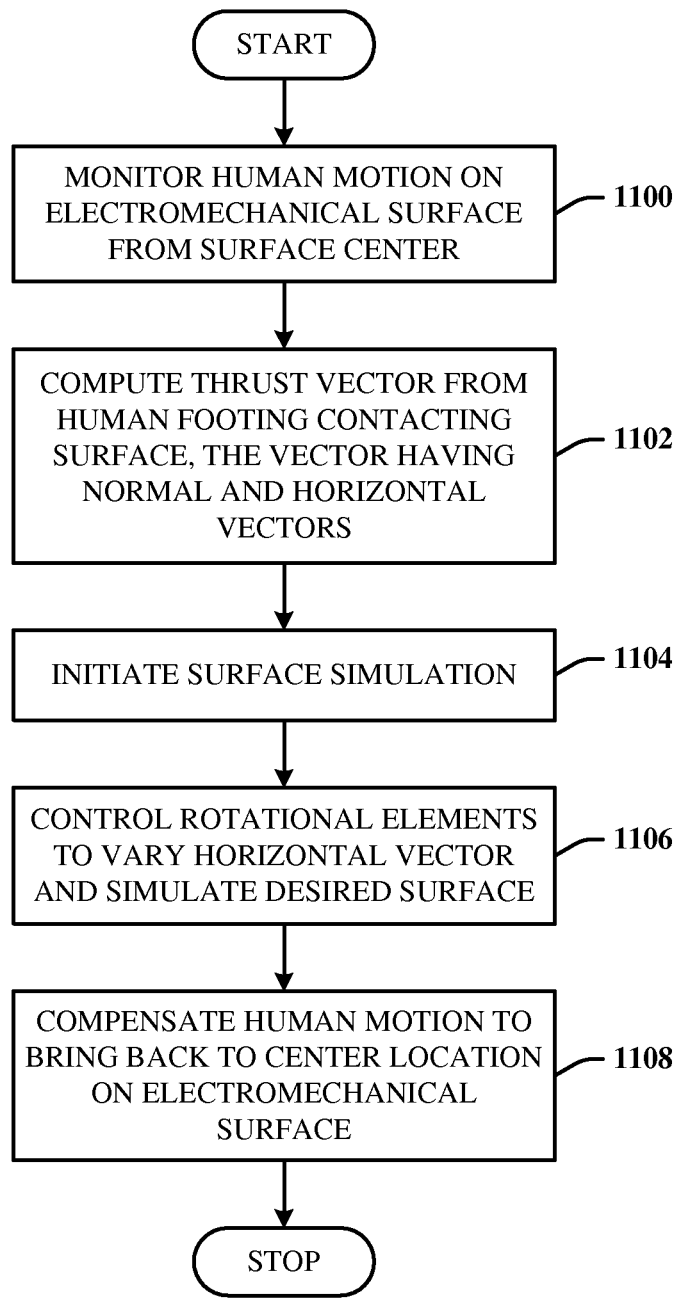
FIG. 11 illustrates a method of simulating a surface.

FIG. 11 illustrates a method of simulating a surface. At 1100, human motion is monitored on the electromechanical surface from the surface center. At 1102, the thrust vector is computed from a human foot on the surface, the vector having normal and horizontal vectors. At 1104, surface simulation is initiated. At 1106, the rotational elements are controlled to vary the horizontal vector and to simulate the desired surface. At 1108, the system compensates the human motion to bring the human back to the center location on the mechanical surface.

Figure 12:
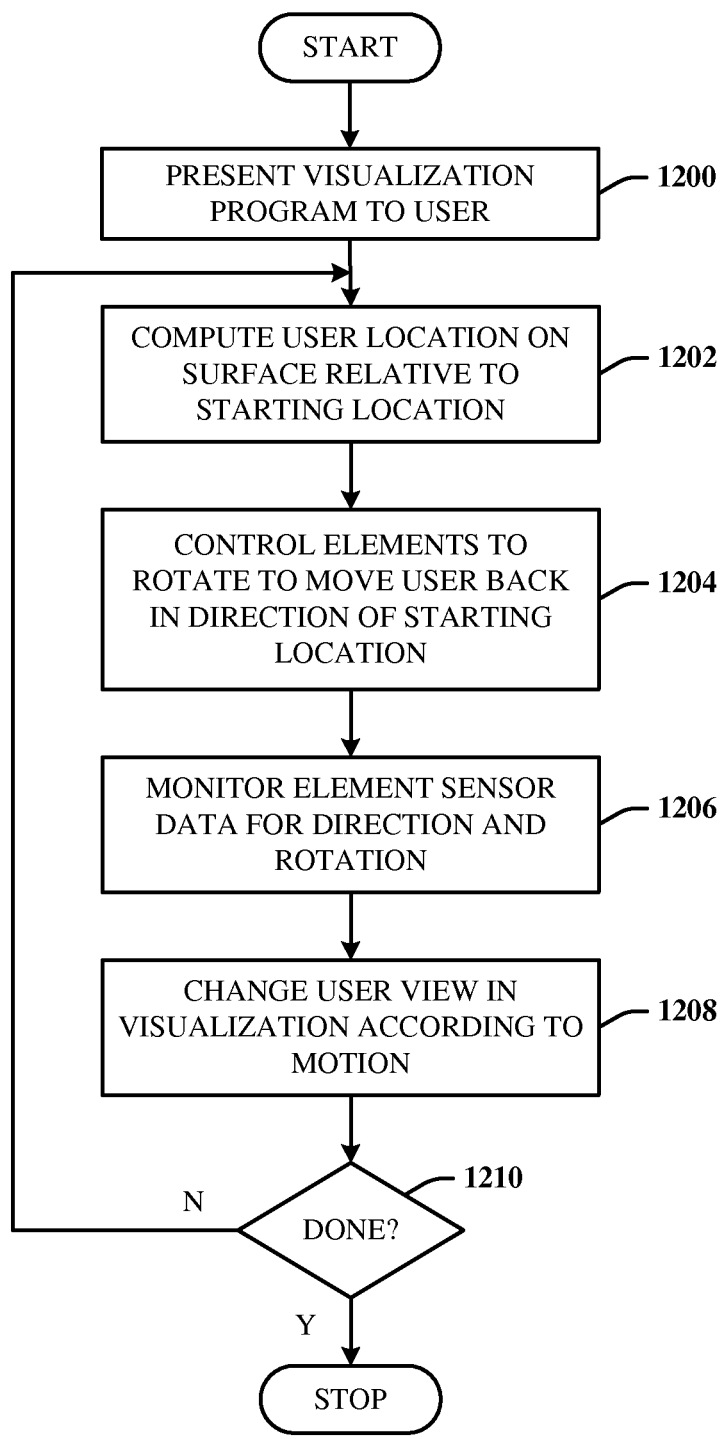
FIG. 12 illustrates a method of controlling visualizations in an immersive environment.

FIG. 12 illustrates a method of controlling visualizations in an immersive environment. At 1200, a visualization is presented to the user. This can be via the control computer system, a different computer system, a television display connected to the computer system and projector system and so on. At 1202, the computer computes the user location on the surface relative to a starting location (e.g., the center of the surface). At 1204, the surface elements (the spheres) are controlled to move the user back in a direction toward the starting location. At 1206, data from the rotational element sensors is monitored for user direction and/or rotation. At 1208, the view in the visualization is changed based on the user motion. At 1210, a check is made to determine if the process is done. If not, flow is back to 1202 to continue the process. If done, the process stops.

As used in this application, the terms "component" and "system" can refer to a computer-related entity, hardware, software, a combination of hardware and software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 13:
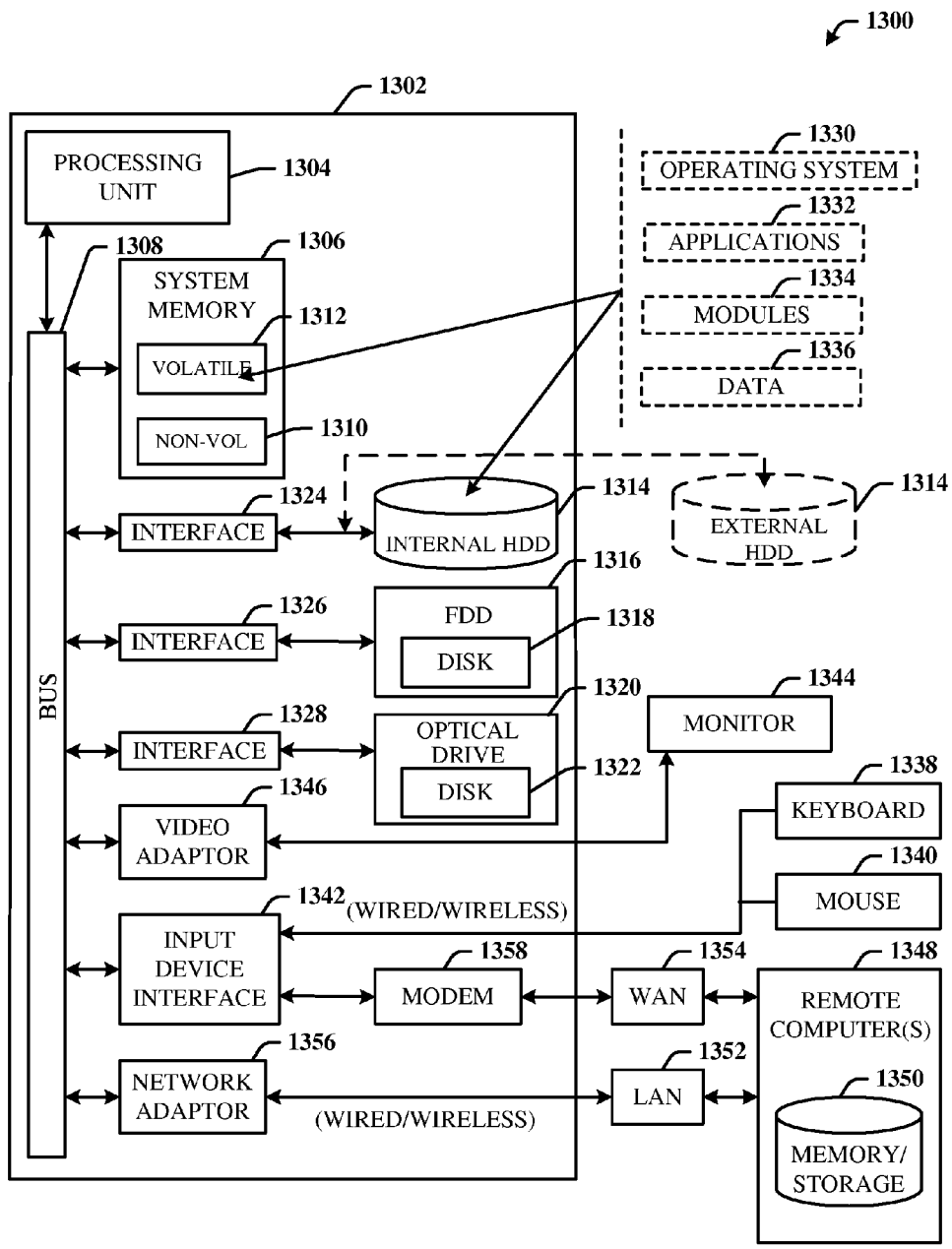
FIG. 13 illustrates a block diagram of a computing system operable to execute monitor and control of the electromechanical surface assemblies and visualization environment in accordance with the disclosed architecture.

Referring now to FIG. 13, there is illustrated a block diagram of a computing system 1300 operable to execute monitor and control of the electromechanical surface assemblies and visualization environment in accordance with the disclosed architecture. In order to provide additional context for various aspects thereof, FIG. 13 and the following discussion are intended to provide a brief, general description of a suitable computing system 1300 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 13, the exemplary computing system 1300 for implementing various aspects includes a computer 1302 having a processing unit 1304, a system memory 1306 and a system bus 1308. The system bus 1308 provides an interface for system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 can include non-volatile memory (NON-VOL) 1310 and/or volatile memory 1312 (e.g., random access memory (RAM)). A basic input/output system (BIOS) can be stored in the non-volatile memory 1310 (e.g., ROM, EPROM, EEPROM, etc.), which BIOS contains the basic routines that help to transfer information between elements within the computer 1302, such as during start-up. The volatile memory 1312 can also include a high-speed RAM such as static RAM for caching data.

The computer 1302 further includes an internal hard disk drive (HDD) 1314 (e.g., EIDE, SATA), which internal HDD 1314 may also be configured for external use in a suitable chassis, a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as a DVD). The HDD 1314, FDD 1316 and optical disk drive 1320 can be connected to the system bus 1308 by a HDD interface 1324, an FDD interface 1326 and an optical drive interface 1328, respectively. The HDD interface 1324 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1312, including an operating system 1330, one or more application programs 1332, other program modules 1334 and program data 1336. The operating system 1330, one or more application programs 1332, other program modules 1334 and program data 1336 can include control algorithms for interfacing to and receiving sensor data, and controlling tilt and element rotation based on feedback loops, as well as to provide forced feedback capability to the mechanical surface.

All or portions of the operating system, applications, modules, and/or data can also be cached in the RAM 1312. It is to be appreciated that the disclosed architecture can be implemented with various commercially available operating systems or combinations of operating systems.

A user can enter commands and information into the computer 1302 through one or more wire/wireless input devices, for example, a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces such as a parallel port, IEEE 1394 serial port, a game port, a USB port, an IR interface, etc.

A monitor 1344 or other type of display device is also connected to the system bus 1308 via an interface, such as a video adaptor 1346. In addition to the monitor 1344, a computer typically includes other peripheral output devices (not shown), such as speakers, printers, etc.

The computer 1302 may operate in a networked environment using logical connections via wire and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the LAN 1352 through a wire and/or wireless communication network interface or adaptor 1356. The adaptor 1356 can facilitate wire and/or wireless communications to the LAN 1352, which may also include a wireless access point disposed thereon for communicating with the wireless functionality of the adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wire and/or wireless device, is connected to the system bus 1308 via the input device interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi (or Wireless Fidelity) and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3 or Ethernet).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A motion compensation system, comprising:
a layer of roller balls with which a user can contact, the layer defined by a perimeter within which movement of the user is confined and monitored, each of the roller balls capable of spherical rotation within the layer for moving a body part of the user to a predetermined location on the layer when the body part of the user contacts an array of roller balls in association with movement of the body part of the user to a current location on the layer;
a location sensing system in association with the layer for dynamically sensing the current location of the body part of the user on the layer relative to the perimeter when the body part of the user contacts the array of roller balls; and
a control assembly integral to the layer, the control assembly comprising a plurality of actuators in contact with the roller balls of the layer, the actuators for rotating the roller balls of the layer with which the body part of the user contacts to move the body part of the user from the current location on the layer, the control assembly controlled to compensate for the movement of the body part of the user to the current location on the layer by moving the body part of the user to the predetermined location on the layer.

2. The system of claim 1, wherein the predetermined location is a previous location of the body part of the user on the layer.

3. The system of claim 1, wherein the roller balls of the array are controlled for two-dimensional rotation to compensate for forward and lateral movement when moving the body part of the user to the predetermined location on the layer.

4. The system of claim 1, wherein the user moves according to bi-pedal locomotion.

5. The system of claim 1, further comprising a sensing assembly integral to the layer for:
sensing rotation of the roller balls of the array when the body part of the user is moved from the current location on the layer to the predetermined location on the layer, and
outputting rotation data.

6. The system of claim 1, wherein the location sensing system senses the current location of the body part of the user based on weight exerted on one or more of the roller balls of the array.

7. The system of claim 1, further comprising a control system in communication with the control assembly for:
receiving sensing information related to at least one of user movement or user rotation, and
controlling the control assembly to move the body part of the user to the predetermined location on the layer.

8. The system of claim 1, wherein the layer is mechanically flexible to conform to a surface that includes one or more curvatures over which the layer is placed.

9. The system of claim 1, wherein the layer is controlled according to a force feedback process to induce physical dynamics into the body part of the user via the roller balls.

10. The system of claim 1, wherein the control assembly drives all roller balls of the layer or a subset of the roller balls of the layer separately.

11. The system of claim 1, wherein the layer is employed in an immersive visualization environment for one or more of simulation, training, or gaming.

12. A motion compensation system, comprising:
a layer of roller balls on which a user can stand and move, the layer defined by a perimeter within which movement of the user is confined and monitored, each of the roller balls capable of spherical rotation within the layer for moving a foot of the user to a previous location on the layer when the foot of the user contacts an array of roller balls in association with movement of the foot of the user from the previous location on the layer;
a location sensing system in association with the layer, the location sensing system comprising a plurality of sensors in contact with the roller balls of the layer, the sensors for dynamically sensing a current location of the foot of the user on the layer relative to the perimeter based on weight exerted on the roller balls of the array; and
a control assembly integral to the layer, the control assembly comprising a plurality of actuators in contact with the roller balls of the layer, the actuators for rotating the roller balls of the layer with which the foot of the user contacts to move the foot of the user from the current location on the layer, the control assembly controlled to compensate for the movement of the foot of the user to the current location on the layer by moving the foot of the user back to the previous location on the layer.

13. The system of claim 12, further comprising a sensing assembly integral to each of the roller balls of the layer for:
sensing rotation of the roller balls of the layer when the foot of the user is moved from the current location on the layer back to the previous location on the layer, and
providing rotation data.

14. The system of claim 13, further comprising a control system for:
receiving and processing the rotation data, and
employing a feedback loop for dynamically controlling the control assembly to compensate for gait dynamics based on the rotation data.

15. A method of providing motion compensation, comprising:
- providing an electromechanical layer of roller balls on which a user can stand and move, the layer defined by a perimeter within which movement of the user is confined and monitored, each of the roller balls capable of spherical rotation within the layer;
- mechanically imposing actuators in contact with the roller balls to drive the roller balls in one or more dimensions when a foot of the user contacts an array of roller balls in association with movement of the foot of the user from a previous location on the layer to a current location on the layer;
- mechanically imposing rotation sensors in contact with the rotational elements for sensing rotation data associated with driving the roller balls in the one or more dimensions to move the foot of the user from the current location on the layer to the previous location on the layer;
- coupling a location sensing system to the layer for computing the previous location on the layer relative to the perimeter and the current location on the layer relative to the perimeter; and
- dynamically controlling rotation of the actuators for rotating the roller balls of the layer with which the foot of the user contacts to move the foot of the user from the current location on the layer, the rotation of the actuators controlled to compensate for the movement of the foot of the user to the current position on the layer by moving the foot of the user back to the previous location on the layer while the user is in motion.

16. The method of claim 15, further comprising computing a thrust vector created as the foot of the user contacts the roller balls of the array.

17. The method of claim 15, further comprising controlling the actuators in contact with the roller balls of the layer with which the foot of the user contacts when moved from the current location on the layer to the previous location on the layer to simulate a surface or terrain type for user locomotion.

18. The method of claim 15, further comprising:
- computing gait and speed of the user; and
- dynamically compensating for the gait of the user and a varying speed of the user.

19. The method of claim 15, further comprising interconnecting a plurality of independent electromechanical layers of roller balls to make an active surface for use by one or more users.

20. The method of claim 15, further comprising controlling speed and view in which a user navigates through a virtual environment based on movement of the user on the layer.

* * * * *